Patented Mar. 24, 1925.

1,530,536

UNITED STATES PATENT OFFICE.

RUDOLF ADLER, OF CARLSBAD, CZECHOSLOVAKIA.

PROCESS FOR THE MANUFACTURE OF DECOLORIZING CHARCOAL OF HIGH ACTIVITY.

No Drawing.   Application filed July 13, 1921.   Serial No. 484,470.

*To all whom it may concern:*

Be it known that I, Dr. RUDOLF ADLER, citizen of the Republic of Czechoslovakia, residing at Carlsbad, in the Republic of Czechoslovakia, have invented certain new and useful Improvements in Processes for the Manufacture of Decolorizing Charcoal of High Activity (for which I have made application for patent in the following countries and on the following dates—to wit, Czechoslovakia, on July 5, 1920; Austria, on June 8, 1921; Hungary, on June 16, 1921; Germany, on June 15, 1921; Sweden, on June 14, 1921; Switzerland, on June 11, 1921; Holland, on June 18, 1921; and Denmark, on June 17, 1921), of which the following is a specification.

The subject of the present invention is a process for the manufacture of a decolorizing charcoal of high activity from the waste liquor of the sulphite-cellulose process.

Processes for the production of decolorizing charcoal from sulphite waste liquor are already known. All of them exhibit the common feature that the waste liquor, either in an untreated condition or after having been deprived of its inorganic constituents, is evaporated to dryness and the evaporation residue carbonized. Consequently very large quantities of water have to be evaporated in order to prepare the decolorizing charcoal from the waste liquor: amounting to about 50 litres of water per kilogramme of water per kilogramme of the charcoal. In view of the high cost of fuels this circumstance makes the possibility of working such processes at a profit very questionable.

The above mentioned drawback is avoided, according to the process hereinafter described, in that, instead of employing the waste liquor, which contains up to about 90% of water, use is made of the organic matter precipitated therefrom. The process consists in precipitating in a well known manner the bulk of the organic constituents of the sulphite waste liquor—which furnish the absorption charcoal on carbonization—thereafter pressing the resulting precipitate, treating said precipitate with alkali compounds, which either have an alkaline reaction or are transformed, by displacement with the inorganic substances in the precipitate, into alkali compounds having an alkaline reaction, and finally carbonizing in the usual manner, the resulting concentrated solution, which may be first completely dried if desired. The inorganic substances precipitated by the addition of the alkali compounds are preferably removed by filtration prior to the carbonizing process.

The deposition of the precipitable organic matter in the sulphite waste liquor can be effected in known manner by separating the said organic matter by the addition of neutral salts such as postassium chloride, sodium chloride and the like, or hydrates of the alkaline earths and the like, preferably at high temperature and under heavy pressure. The resulting precipitate is treated with alkali compounds such as hydroxides, carbonates, phosphates, sulphates and the like whereby the organic matter in the precipitate is converted into a form that is soluble in water and especially suitable for the subsequent carbonizing process.

The carbonization product contains the whole of the organic matter, including alkalis—the latter chiefly in the form of sulphides. If, after the addition of alkali compound, the precipitated organic matter has been removed by filtration, the carbonization product will then contain alkalis—chiefly as sulphides—solely in a form that is soluble in water.

To render the alkali sulphide suitable for use over again in the process, the sulphide leached out of the residue from the carbonizing process can be converted into carbonate by treatment with carbon dioxide. In this connection it has been ascertained that the conversion of the sulphide into the carbonate proceeds much quicker and without any considerable excess of carbon dioxide being required, if carried out in the presence of the wet decolorizing charcoal. It is therefore preferable to pass the carbon dioxide into an aqueous suspension of the carbonization product and to effect the extraction with water afterwards. In that case a liquor is obtained which contains the regenerated alkali carbonate whilst the liberated sulphuretted hydrogen can be rendered innocuous in a well-known manner.

According to the above described process, 70 to 80% of the water content of the original sulphite waste liquor is excluded from the process, which water would otherwise have to be evaporated. This circumstance clearly shows the great economic superiority of the described process over those already known.

To explain the process, one way of carrying out the same may be illustrated by an example.

20 kilogrammes of calcium oxide, or the equivalent amount of another alkaline earth oxide, are slaked with a minimum quantity of water, and stirred with 1,000 litres of sulphite waste liquor. The mixture is heated in an autoclave for about an hour, preferably under a pressure of several atmospheres, and the deposit obtained by the end of this time is pressed. After being dehydrated as completely as possible, the precipitate is mixed with an aqueous solution containing 50 kg. of carbonate of potash—or less, preferably, with 40 kg. of carbonate of soda—and raised to the boiling point, being kept stirred all the time, whereby the organic matter is converted into a form soluble in water, the mass thereby becoming fluid. The resulting solution is hot-pressed, the filtrate after having been completely dried if desired is carbonized in the well known manner, out of contact with air, whereupon the carbonization product is suspended in water, and carbon dioxide is passed into the moist mass. After the sulphide contained in the carbonization product has been converted into carbonate the mass is leached in the usual manner, the decolorizing charcoal is dried and the extracted solution of alkali carbonate is utilized for dissociating the next batch of precipitate.

The residue from the manufacture of alcohol from sulphite waste liquor can also be used to advantage instead of sulphite-cellulose waste liquor.

I claim as my invention:

1. The process of producing a highly active decolorizing charcoal from waste sulfite-cellulose liquor, which consists in adding lime thereby precipitating the precipitable organic constituents of these liquors especially lignine substances, then separating the precipitate by filtration, then mixing it with alkali compounds so as to impart to it an alkaline reaction, carbonizing the resulting solution, leaching the decolorizing charcoal with water and finally drying it.

2. In the process as specified in claim 1, the step of filtering the resulting solution prior to carbonizing the same.

3. In the process as specified in claim 1, the step of passing carbon dioxide gas into an aqueous suspension of the carbonization product thereby converting the sulfide contained therein into carbonate, and subsequently separating the decolorizing charcoal from the mixture by means of water.

In testimony whereof I have hereunto set my hand in presence of two subscribing witnesses.

Dr. RUDOLF ADLER.

Witnesses:
 Hans Kurst,
 Rutan Zillhauer.